United States Patent [19]

Clark

[11] Patent Number: 4,679,000
[45] Date of Patent: Jul. 7, 1987

[54] BIDIRECTIONAL CURRENT TIME INTEGRATION DEVICE

[76] Inventor: Robert Clark, 1341 Rosecrans St., San Diego, Calif. 92106

[21] Appl. No.: 746,751

[22] Filed: Jun. 20, 1985

[51] Int. Cl.$^4$ .......................... H02J 7/00; G01R 11/00
[52] U.S. Cl. .................................. 324/428; 324/426; 320/44
[58] Field of Search .................... 320/43, 44; 340/636; 324/425–428, 435, 436

[56] References Cited

U.S. PATENT DOCUMENTS

| | | | |
|---|---|---|---|
| 3,895,284 | 7/1975 | Schweizer et al. | 320/48 |
| 3,899,548 | 8/1975 | Perelle et al. | 320/48 |
| 3,971,980 | 7/1976 | Jungfer et al. | 324/29.5 |
| 4,012,681 | 3/1977 | Finger et al. | 320/14 |
| 4,021,718 | 5/1977 | Konrad | 320/48 |
| 4,086,524 | 4/1978 | Kremer | 320/33 |
| 4,153,867 | 5/1979 | Jungfer | 320/43 |
| 4,194,146 | 3/1980 | Patry et al. | 320/44 |
| 4,258,306 | 3/1981 | Bourke et al. | 320/48 |
| 4,288,734 | 9/1981 | Finger | 320/48 |
| 4,377,787 | 3/1983 | Kikuoka et al. | 324/431 |
| 4,390,841 | 6/1983 | Martin et al. | 324/427 |

Primary Examiner—Reinhard J. Fisenzopf
Assistant Examiner—Jose M. Solis
Attorney, Agent, or Firm—Frank D. Gilliam

[57] ABSTRACT

A bidirectional current-time integrator device comprises a shunt for connection in a circuit and an integrating circuit having inputs connected to opposite ends of the shunt through a switching device. The integrating circuit integrates an input signal from the shunt with time to produce a stream of pulses at a frequency proportional to the current with each pulse representing a given unit of current time. A bidirectional counter assembly counts the pulses from the integrating circuit in one direction when the current is in one direction, and in the opposite direction when the current reverses. The integrator circuit includes means for storing any partial unit of current time accumulated whenever the current direction changes and adding that partial unit to the subsequent accumulation of the signal when the current changes back to the original direction. The device may be used as a battery discharge state monitor.

9 Claims, 3 Drawing Figures

BIDIRECTIONAL CURRENT TIME INTEGRATION DEVICE

BACKGROUND OF THE INVENTION

The present invention relates to a device for connection in a circuit to integrate the current flowing in the circuit with time in either direction. Such a device is particularly useful, for example, as a battery discharge state indicator, since it can be connected in circuit with and adjacent to a battery so as to monitor the current flowing into and out of the battery with time, and can therefore provide an indication of the present discharge state of the battery in units of current time.

Such current integration devices have been used in the past as battery monitors or ampere hour meters, and commonly comprise a current sensor for connection in a circuit, i.e. in series with the battery, and an integrator for connecting across the sensor so as to integrate the voltage across the sensor with time. Since the voltage across the sensor is directly proportional to the current flowing through it, the output of the integrator comprises a series of pulses at a frequency proportional to the current flowing through the sensor. In other words, each pulse will represent a predetermined unit of current-time (or ampere hours). The integrator is connected to a suitable bidirectional counter for counting the pulses in one direction when the current flow is in one direction, and in the opposite direction when the current flow changes direction.

Where such a device is used as a battery monitor, the output will provide an indication of the discharge state, or total ampere hours removed from the battery. When the battery is discharging and the current direction is out of the battery, the counter will count in one direction. When the battery is being charged and the current direction is into the battery, the counter will count in the opposite direction. Thus, the user of a device operated by the battery can see how many ampere hours have been consumed at any time, and therefore has an indication of the discharge state, or the ampere hours removed from the battery. The user will therefore be able to estimate whether the battery is able to start and/or operate a device efficiently at any time.

U.S. Pat. Nos. 3,971,980 and 4,153,867, of Jungfer et al describe a current integration device comprising a battery testing apparatus including a comparator and an integrating element. a digital counter is included in the circuit which runs backwards under charge and forward under discharge. The comparator controls reversal of the integrating element with respect to either the charging or the discharging of the battery.

U.S. Pat. No. 3,895,284 of Schweizer et al describes a device of the same type including a switch between a measuring resistance connected in the battery circuit and an integrating circuit. The switch acts to switch the polarity of a voltage input to the integrating circuit whenever a specific positive or negative value of the integrator output signal is reached. The integrating circuit is also arranged to take into account the fact that the amount of current supplied to the battery during charging must be greater than the amount drawn during discharging, since a proportion of the charging current will always be lost as a result of charging inefficiency and self-discharge. This is achieved by having two different time constants in the integrating circuit so that the pulses are produced at longer time intervals during charging than during discharging when a current of the same intensity flows through the measuring resistance.

U.S. Pat. No. 4,288,734 of Finger describes a bidirectional integrator having first and second programmable pulse forming channels, a bidirectional counter, and an output display. Each pulse forming channel can be continuously and discreetly adjusted to change the repetition rate of the pulses produced. One channel is connected to integrate the charging current and the other channel integrates the discharging current. The pulse output rates of the channels are adjusted so that the count registered during the charging cycle is the same as that registered during the discharging cycle.

In U.S. Pat. No. 3,898,548 of Perelle et al, a bidirectional integrator is described which includes a threshold device permitting the counting of impulses only when the detected current is above a predetermined threshold value, to avoid stray leakage currents.

U.S. Pat. No. 4,086,524 of Kremer shows a battery charge monitor including an integrating amplifier connected to generate a voltage representative of the state of charge of the battery and a detector circuit connected to give an alarm when this voltage passes out of the normal range.

In all of these cases and in similar devices where an integrator is adapted to provide a pulse for each predetermined unit of current time, inaccuracy results from the loss of partial integration values when current changes direction. Where the device is used to monitor a battery, charge/discharge transitions can occur at a rate of several hundred per second in normal battery operations as, for example, when the battery is charging under load and repeatedly switches from charge to discharge. These circumstances may give rise to significant errors in the output of the device.

SUMMARY OF THE INVENTION

It is a primary object of the present invention to provide a current integration device in which losses when the current changes direction are significantly reduced or eliminated.

According to the present invention a current-time integration device is provided which comprises a current sensor, such as a shunt for connection in series in a circuit in which current can flow in either direction, and an integrating assembly for connection across the sensor so as to integrate an output signal produced by the sensor with time and to produce a series of output pulses at a pulse rate proportional to the sensor output signal, and thus the current flowing through the sensor. Each pulse represents a given unit of current-time. A bidirectional counter is provided for counting the pulses in opposite directions according to the direction of the current through the shunt. A comparator is connected to the current sensor to detect the shunt current direction, and controls the counter to count up or count down according to the detected current direction. The comparator also controls the polarity of the inputs to the integrating assembly, reversing the input polarity each time the shunt current direction reverses.

According to the invention the integrating assembly includes a means for storing any partial units of integrated current-time present at each change in current direction so that these partial values are included in the output pulses at the next change in current direction.

In the preferred embodiment of the invention, the integration device comprises a battery monitoring device or ampere hour meter. The current sensor, preferably a shunt, will be connected in series with and adjacent to the battery. The counter will count pulses from the integrating assembly in one direction when the battery is charging and in the other direction when the battery is discharging.

In one preferred embodiment of the invention partial integration values are stored by means of parallel switched integrating capacitors selectively connected across an amplifier in response to charge/discharge cycles. A switch controlled by the comparator is arranged to switch from one capacitor to the other in response to a change in the current direction. Thus one integrating capacitor will continuously charge up, trigger, and reset while the battery is charging up. If the battery should discharge during this process, the switch will disconnect the charge capacitor from the circuit and connect the discharge capacitor across the amplifier to integrate the discharge signal. Any partial integration value or partial unit of integrated current time on the charge capacitor will therefore be stored until the polarity changes back again, at which point the charge capacitor is connected back across the amplifier and subsequent charging integration values are added to the stored values.

In the preferred embodiment of the invention the counter comprises two sections, one for counting pulses when the current is in one direction and one for counting pulses when the current is in the opposite direction. The sections are selectively connected to the integrating assembly in response to control signals from the comparator. Where the device is used to monitor a battery, an indicator is provided to combine the outputs from the two sections to produce the continuous reading for battery discharge level.

Since not all of the charging current detected will be retained by the battery, according to a preferred feature of the invention a means of compensating for the charging inefficiency is provided. The compensation is preferably provided by arranging the integrating assembly to produce fewer pulses during charging than during discharging for the same current through the sensor. Alternatively, the charge counting section of the counter may be arranged to produce less output pulses for a predetermined number of input pulses than the discharge counting section to take into account the charging inefficiency of the battery.

In an alternative embodiment of the invention the integrating assembly includes two separate integrator means, one for producing output pulses when the sensor current is in one direction and another for producing output pulses when the shunt or sensor current is in the opposite direction. A switching device is provided to select the integrator inputs and is controlled by the comparator for selectively connecting one of the integrators to the current sensor when the current through the sensor is in one direction and the other integrator to the current sensor when the current through the sensor is in the opposite direction. The inputs to the integrator which is not being used are connected together so that any partial integration value will be saved until the next time that integrator is reconnected into the circuit.

The current-time integration device of the preferred and alternative embodiments of the present invention therefore will not lose partial integration values or partial units of integrated current-time. If used as a battery monitor, the device had the advantage that a more accurate indication of the state of the battery is produced. It is therefore an object of the present invention to provide a bidirectional current-time integration device which is more accurate since partial integration values are retained.

BRIEF DESCRIPTION OF THE DRAWINGS

The above and other advantages of the present invention will be more apparent from the following description of some preferred embodiments of the invention, together with the drawings, in which like reference numerals refer to like parts and in which.

DESCRIPTION OF THE PREFERRED EMBODIMENTS

Figure 1:
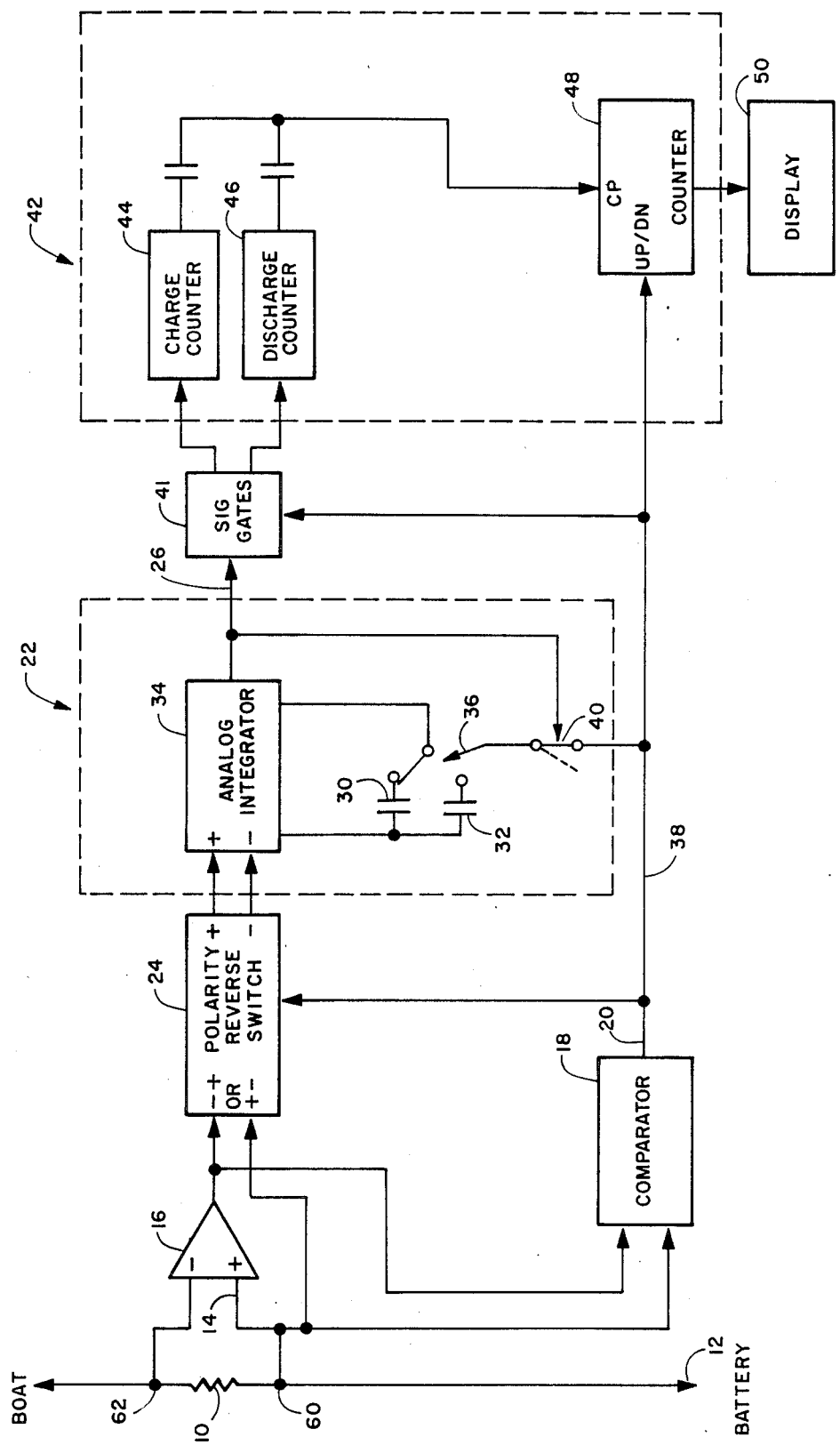
FIG. 1 is a block schematic diagram of a battery charge monitoring device according to a preferred embodiment of the present invention.
Figure 2:
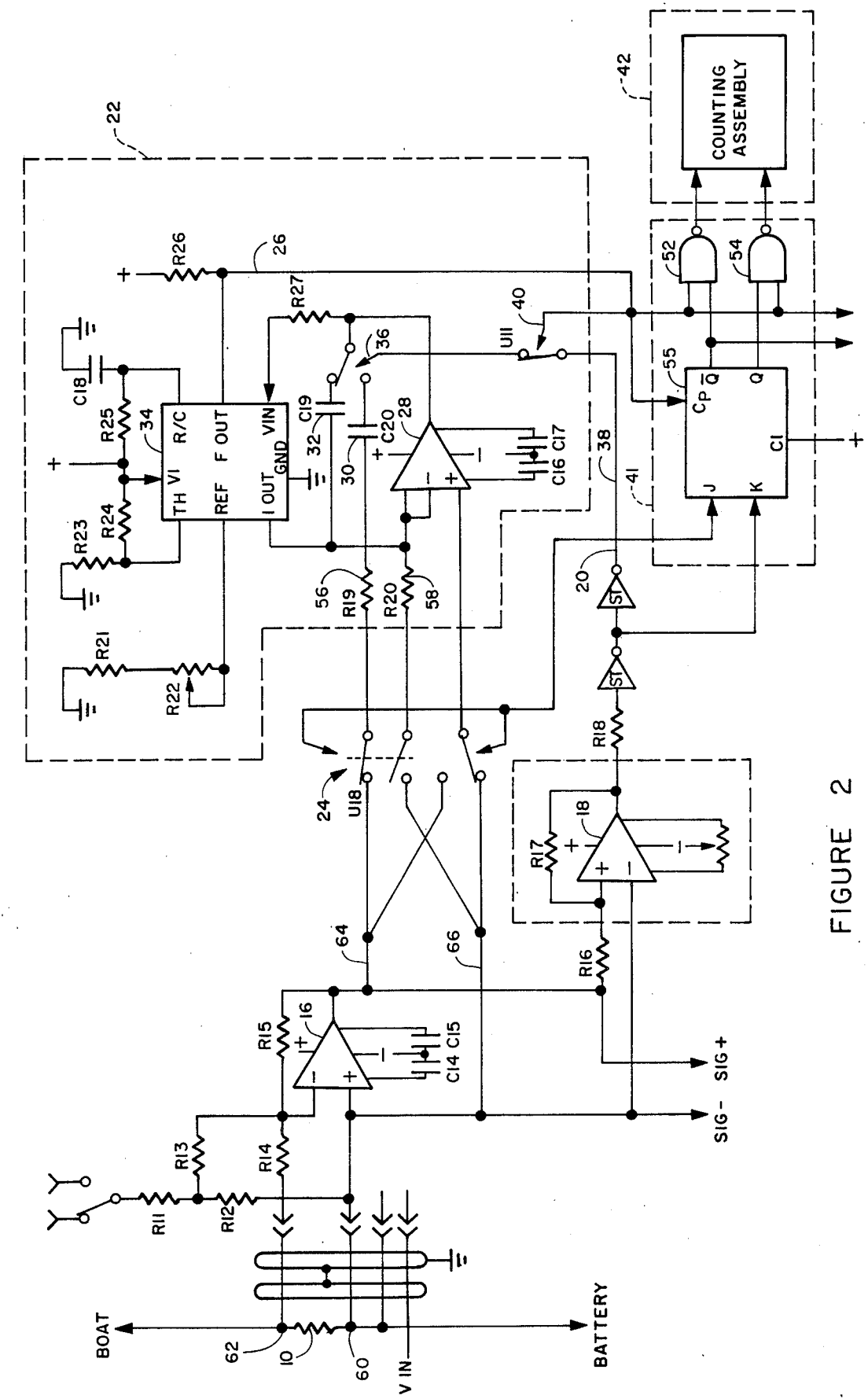
FIG. 2 is a more detailed circuit diagram of the device shown in FIG. 1.

FIGS. 1 and 2 of the drawings show a preferred embodiment of a battery charge monitoring device or ampere hour meter according to the present invention. A shunt 10 is placed in circuit with and adjacent to the negative pole 12 of a battery to detect the current flowing into the battery during charging and out of the battery during discharging.

An input amplifier 16 is connected across the shunt to amplify a source signal comprising the input voltage 14 across the shunt, and a comparator 18 is connected to the input amplifier output and the shunt 10 to produce an output control signal 20 responsive to the current direction. The control signal 20 will be high during charging and low during discharging of the battery. An integrating circuit 22, shown in more detail in FIG. 2, is connected via a switching device 24 to the input amplifier 16 output and integrates the input voltage to produce a stream of pulses at its output 26 at a frequency proportional to the time integrated input voltage and thus proportional to the current flowing into or out of the battery. Each pulse will represent a given unit of integrated current time.

The switching device 24 is controlled by the comparator 18 to reverse the polarity of the input signal to the integrating curcuit whenever the current passing through the shunt changes direction.

As seen in FIG. 2 the integrating circuit basically comprises an operational amplifier 28, and paralled switched integrating capacitators 30,32 connected across the amplifier. A pulse generator 34 of the type LM 331, available from National Semi-Conductor, Inc. is also connected to the amplifier for producing the stream of output pulses from a negative DC input voltage. The frequency of the pulse tram is directly related to the level of the negative DC input voltage. The capacitors 30,32 are selectively connected across the amplifier via a two-position switch 36 such that only one of the capacitors is connected to the amplifier at any one time. The position of the switch is controlled by the comparator output signal 20 via line 38 and one-way switch 40 (see FIG. 1), which is normally closed but opens during output pulses. Switch 40 prevents the integratoor from changing state during output pulses.

The output of the integrating circuit 22 is connected via a gate switching assembly 41 to a bidirectional counting assembly 42. The counter comprises two digital integrators 44,46, one for charge and one for discharge, and a third integrator or up-down counter 48 which accumulates the results of the first two. The integrator 48 has an output display 50 (see FIG. 1) which indicates the continuous discharge state of the battery. The display is in the form of a digital readout which is preset to zero indicating the fully charged state of the battery and which counts down (0, −1, −2 ...) as ampere hours are consumed to show discharge comsumption, and counts up as the battery is re-charged.

The gate switching assembly 41 is arranged to connect output signal 26 from the integrating circuit 22 to the charge integrator 44 while the battery is charging and to the discharge integrator 46 while the battery is discharging. It preferably comprises logic gates 52 and 54 controlled by the comparator output via J-K flip flop 55 as shown in FIG. 2. Thus the number of pulses at the output of the integrating assembly during charging of the battery will be counted by the digital integrator 44, and the number of pulses produced during discharging will be counted by integrator 46. The third integrator 48 comprises a digital up/down counter which counts up while the battery is charging and down while the battery is discharging. The output of the counting assembly is arranged to be in ampere hours, as will be explained in more detail below.

The device is arranged to correct for the charging inefficiency of the battery. Although substantially all of the discharge current detected by the shunt 10 will represent charge lost by the battery, not all of the charging current detected by the shunt will be retained by the battery.

In the preferred arrangement, battery charging inefficiency is corrected or compensated as shown in FIG. 2. In FIG. 2 the polarity reversing switching device 24 is arranged to connect the input to the integrating circuit through two different resistors 56, 58, respectively according to the polarity of the input signal. The input current to the integrators will be set by the value of the resistors, and the two resistors are arranged to have different values so as to compensate for battery charging inefficiency. Thus a lower input current is provided to the integrator via resistor 58 during charging than via resistor 56 during discharging. In one example the value of resistor 58 is about 78% of the value of resistor 56. This means that for the same input signal to switching device 24 fewer output pulses are produced by the integrating circuit 22 during charging than during discharging.

An alternative way of correcting for battery charging efficiency is to provide two different count rate integrators, so that the number of input pulses required to produce an output pulse from the integrator 44 will be more than the number of input pulses required to produce an output pulse from the integrator 46.

The operation of the circuit shown in FIGS. 1 and 2 will now be described in more detail. FIG. 2 shows the various switches in their position during disccharge of the battery. Considering first the situation where the battery is discharging and current is flowing out of the battery through the shunt, the output signal 20 from the comparator 18 will be low since the battery end 60 of the shunt will be negative relative to the other end 62 of the shunt. The switching device 24 will then be positioned as shown in FIG. 2, with input 64 connected through resistor 56 to the negative input of amplifier 28 and input 66 connected to the positive input of amplifier 28. The output signal 20 from the comparator will also control the position of switch 36 so that capacitor 32 is connected across the amplifier. Signal 20 will also be input to J-K flip-flop 55 to control signal gates 52 and 54 so that the output signal 26 from the integrating circuit is connected to the discharge counting integrator 46.

The equation for the integrating circuit may be expressed as:

$$N \text{ mA-sec} = \int_{T_0}^{T_1} V(t)dt \tag{1}$$

where N is the per pulse resolution of the integrator 14 in mA-Sec and V(t) is the function with respect to time which describes the voltage as seen across the shunt from time $t_0$ to $t_1$, which will be directly proportional to the current flowing through the shunt. Thus, for every pulse output of the integrating assembly, a current time of N ma-seconds (N milliamp—seconds) will have passed through by the shunt. After each pulse, the integrating assembly goes through a controlled reset cycle and starts accumulating charge again.

If the battery is charging, the various switches in the system will be reversed so that the input to the amplifier 28 will be connected via resistor 58, the capacitor 30 will be connected across the amplifier, and the output pulses will be counted by charge counting integrator 44.

The integrating circuit will produce different numbers of output pulses for the same input current across the shunt during charging than during discharging, because of the difference in value of the two input resistors 56 and 58. Thus, for the same current flowing across the shunt, $P_D$ pulses will be produced during discharging and $P_c$ pulses will be produced during charging, where $$P_c = P_D (C \times 10^{-2}) \text{ Pulses} \tag{2}$$

or $$P_D = P_c/C \times 10^{-2} \text{ Pulses}$$

and C is equal to the battery charge retention in percent. This is of the order of 75 to 90% for most batteries.

During typical charging of a battery under load charge/discharge transitions can occur at rates of up to a thousand per second. At each transition any partial charge remaining on charge capacitor 30 will be stored until the next discharge/charge transition, and will then be added to the output during that charging cycle. Similarly, any partial integration charge on discharge capacitor 32 will be stored when the next input signal polarity change causes the switch 36 to switch back to the capacitor 30. Thus, partial integration values are saved, and a more accurate indication of the battery discharge level will be produced.

In the preferred embodiment, the integrator output is set for a resolution of 4.4 mA-Sec/Pulse. The discharge and charge integrators each comprise 0–8192 ($2^{13}$) counters, set for 8192 or 81920 pulses per $10^{-2}$ or $10^{-1}$ ampere hour respectively.

The output of the charge and discharge integrators are connected to respective inputs of up/down counter 48 which produces an output to a digital display 50 representing the Ampere hours discharged by the battery, with zero corresponding to the fully charged state of the battery. Thus the display indicates the total charge consumption.

For a $10^{-2}$ A Hr display integrator resolution, one pulse output to the up-down counter represents $10^{-2}$ A Hr flowing through the shunt. Thus if N mA sec flows through the shunt, the output of the up-down counter must be $10^{-2}(3.6\times10^6)/N$ pulses.

In one specific example of a circuit according to the invention, low power CMOS components were used. The input amplifier 16, comparator 18 and integrator amplifier 28 were 7652, 411A and 7650 operational amplifiers. The limiting factor for the size of shunt which can be used is the pulse/second capability of the analog integrator. The voltage required from the shunt to produce one pulse per second from the integrator gets smaller as the size of the shunt gets larger. The following table shows the shunt sizes used in amps with corresponding values for the resistors 56 and 58 and full scale pulse frequency. The resistor values are smaller for larger size shunts, so that the same input currents are produced for the same absolute currents flowing across the shunt.

Shunt-Resistor Table

| SHUNT | RESISTOR (56) | RESISTOR (58) | FULL SCALE FREQUENCY |
|---|---|---|---|
| 50 | 332K | 422K | 11.375 KHz |
| 75 | 221 | 280 | 17.067 |
| 100 | 165 | 210 | 22.756 |
| 150 | 110 | 140 | 34.134 |
| 200 | 84.5 | 107 | 45.112 |
| 250 | 66.5 | 84.5 | 56.889 |
| 300 | 54.9 | 69.8 | 68.267 |
| 400 | 41.2 | 53.6 | 91.023 |
| 500 | 33.2 | 42.2 | 113.778 |

The accuracy of the integrator will be independent of the exact values of the two capacitors 30 and 32.

In the same specific example the counting assembly 42 included the following components, although it will be clear that many alternative components may be used. The counters 44 and 46 were 4020 counters having their respective inputs connected to gates 52 and 54, respectively. Up-down counter 48 was a 4518 with pin 1 connected to the output of counter 44 and pin 9 connected to the output of counter 46. Two outputs taken from pins 6 and 14 of the counter 48 were connected along separate output paths to a common input to indicator 50. Each output path included a IN4148 diode and an RC network connected in series with the diode. Each RC network comprised a 1 Ohm resistor connected in parallel with a 470 Picofarad capacitor.

The battery meter described above provides a relatively accurate reading of the present charge state of a battery since partial integration values will not be lost. This is significant where charge/discharge transitions can occur at rates of up to a thousand per second. Relatively few components are necessary in the circuit because of its design and thus the power requirement of the meter is relatively low.

Figure 3:
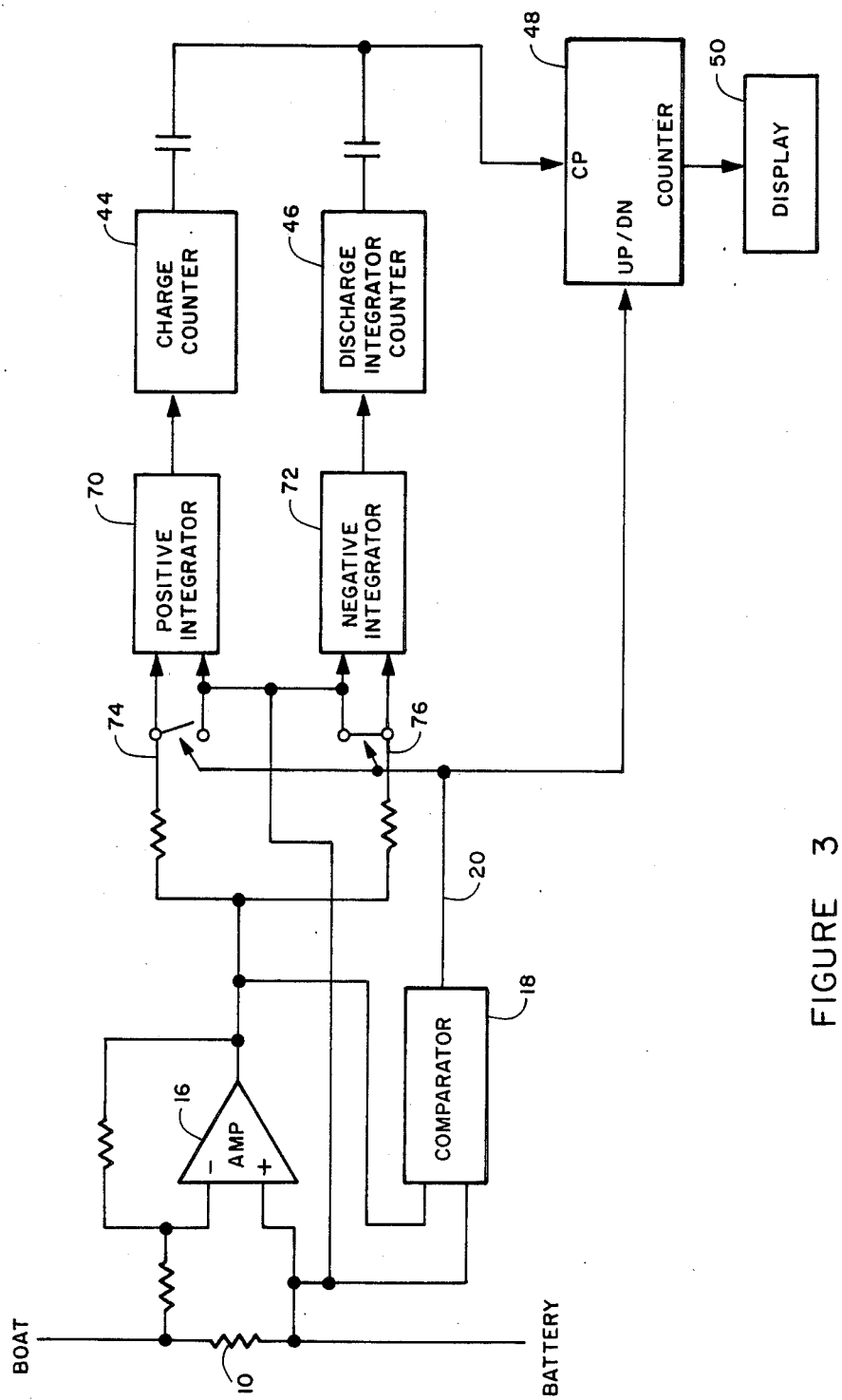
FIG. 3 is a block schematic diagram similar to FIG. 1 showing an alternative embodiment of the present invention.

FIG. 3 shows an alternative battery charge monitoring device according to the invention, in which parts equivalent to those shown in FIG. 1 have been given like reference numerals. In this embodiment instead of using a switched integrating capacitor system as in FIG. 1 to store partial integration values, two separate integrators 70, 72 are used which are selectively connected to the output of input amplifier 16 by means of switches 74, 76 controlled by the comparator output signal 20. The inputs of the integrator not being used are tied together by its input switch, so that any partial integration or partial unit of integrated current-time present before the input signal polarity changed will be retained. The output of the charge and discharge integrators 70, 72 are connected directly to the charge and discharge counting integrators 44 and 46, respectively. The circuit shown in FIG. 3 is otherwise the same as that shown in FIG. 1, described in detail above, so further details of its operation will be understood from the description of FIG. 1. Charge inefficiency compensation may be provided in a similar manner to the first embodiment by suitable input resistance values to the two integration 70 and 72, or by suitable arrangement of the counters 44 and 48 to produce output pulses in response to different numbers of input pulses.

The monitoring device of this invention is suitable for connection to any battery in a battery driven device to monitor the discharge state of the battery so that the operator can determine when the charge level is too low for efficient operation of the device. It may be used, for example, to monitor an electric vehicle battery, but it is particularly useful in marine applications. In both applications, charge/discharge transitions can occur which will cause conventional ampere hour meters to be inaccurate. With the device of this invention this problem is overcome and the output result is more accurate, since partial integration values are not lost.

The device of this invention is not limited to use as a battery monitor, but may be used in any circuit to monitor current flowing in either direction in the circuit. Although some preferred examples of the invention have been described above by way of example, it will be understood by those skilled in the field that modifications may be made to the described embodiments which are within the scope of the invention, which is defined by the appended claims:

What is claimed is:

1. A bidirectional current-time integration device for use in a circuit in which current direction changes repeatedly, the device comprising:

current sensor means connected in series with a circuit in which the current direction changes repeatedly, for producing a source signal proportional to the current through the circuit which changes polarity when the current changes direction;

integrator means which includes an amplifier responsive to said source signal for producing a stream of output pulses at a rate dependent on the magnitude of current through the current sensor means, each pulse representing the accumulation of a given unit of integrated current-time;

bidirectional counter means including a first storage means for accumulating said source signal with time when said current is in one direction and a second storage means for accumulating said source signal when said current is in the opposite direction, said first and second storage means comprise a pair of integration capacitors, and integrator switch means for selectively switching from one storage means to the other storage means each time the current changes direction, said integrator switch means comprises a switch responsive to said current direction for selectively connecting one of said capacitors across said amplifier and disconnecting the other capacitor each time the current changes direction, such that any partial charge on the disconnected capacitor is stored, one of said capacitors being connected across said amplifier when the current is in one direction and the other capacitor being connected across the amplifier when the current is in the opposite direction, said amplifier having inputs from connection to said source signal, polarity reversing switch means being connected across said input and responsive to changes in current direction to reverse the polarity of said amplifier inputs, said first and second storage means storing any partial unit of integrated current-time present on said storage means when disconnected until the next current direction change.

2. The device of claim 1, wherein said integrator means further comprises means for producing output pulses at a rate dependent on the current direction through the sensor means.

3. The device of claim 1 for connection to a battery to monitor the discharge state of the battery, the current sensor means comprising a shunt for connection in circuit with the battery, the integrator means first storage means comprising means for integrating said source signal during battery charging and said second storage means comprising means for integrating said source signal during battery discharging.

4. The device of claim 1, wherein said first and second storage means comprise a pair of integrating circuits, and said integrator switch means comprises means for selectively connecting one of said integrating circuits across said sensor when the current is in one direction and the other of said integrating circuits across said sensor when the current is in the opposite direction, each circuit having a pair of inputs and said integrator switch means further comprising means for tying together the inputs of the disconnected circuit at each current direction change, whereby any partial unit of current time in said disconnected circuit is stored until the next current direction change and added to any further accumulated source signal.

5. The device of claim 4, wherein said bidirectional counter means comprises a first counter for counting pulses corresponding to one current direction and a second counter for counting pulses corresponding to the opposite current direction, one of said integrating circuits having an output connected to said first counter and the other integrating circuit having an output connected to said second counter, the outputs of said counters being connected to an up/down counter for counting up when the current is in one direction and counting down when the current is in the opposite direction.

6. A bidirectional current-time integration device for use in a circuit for connection to a battery to monitor the discharge state of the battery in which the current direction changes repeatedly, the device comprising:

current sensor means comprising a shunt for connection in the circuit with the battery connected in series with a circuit in which the current direction changes repeatedly, for producing a source signal proportional to the current through the circuit which changes polarity when the current changes direction;

integrator means comprising an amplifier and a pair of capacitors for selectively connecting across said amplifier during battery charging and discharging, respectfully, responsive to said source signal for producing a stream of output pulses at a rate dependent on the magnitude of the current through the current sensor means, each pulse representing the accumulation of a given unit of integrated current-time;

compensation means for producing fewer output pulses from said integrator means for the same input signal during charging than during discharging by an amount equivalent to the charge retention value of the battery, said compensation means comprising a pair of resistors connected in parallel to one of the inputs of said amplifier;

switch means comprising means for connecting said source signal through a first one of said resistors to said amplifier input during charging and through a second one of said resistors during discharging, said first resistor having a higher value than said second resistor;

bidirectional counter means for counting the output pulses from said integrator means, said counter means being responsive to the current direction to count in one direction while the sensor means current is in one direction and in the opposite direction while the sensor means current is in the opposite direction; and said integrator means including a first storage means comprising means for integrating said source signal during battery charging and for accumulating said source signal with time when said current is in one direction and a second storage means comprising means for integrating said source signal during battery discharging for accumulating said source signal when said current is in the opposite direction, and integrator switch means for selectively switching from one storage means to the other storage means each time the current changes direction, said first and second storage means storing any partial unit of integrated current-time present on said storage means when disconnected until the next current direction change.

7. The device of claim 3, wherein the said counter means comprises a first counter for counting said pulses during battery charging and a second counter for counting said pulses during battery discharging, said first counter producing an output pulse in response to a greater number of input pulses than the second counter by an amount equal to the charge retention value of the battery.

8. The device of claim 3, further including compensation means for producing fewer output pulses from said integrator means for the same input signal during charging than during discharging by an amount equivalent to the charge retention value of the battery.

9. The device of claim 6, wherein said second resistor has a value of between 80% and 90% of said first resistor.

* * * * *